US012800016B2

(12) United States Patent
Lebas et al.

(10) Patent No.: US 12,800,016 B2
(45) Date of Patent: Nov. 17, 2026

(54) DIFFERENTIAL MODULE

(71) Applicant: VALEO EMBRAYAGES, Amiens (FR)

(72) Inventors: Gilles Lebas, Amiens (FR); Paolo Viola, Amiens (FR); Pierre Pataut, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 19/261,297

(22) Filed: Jul. 7, 2025

(65) Prior Publication Data

US 2026/0009457 A1 Jan. 8, 2026

(30) Foreign Application Priority Data

Jul. 8, 2024 (FR) ...................................... 2407453

(51) Int. Cl.

| | |
|---|---|
| ***F16H 48/08*** | (2006.01) |
| ***B60K 17/02*** | (2006.01) |
| ***F16H 37/08*** | (2006.01) |
| ***F16H 48/24*** | (2006.01) |
| ***F16H 48/30*** | (2012.01) |
| ***F16H 63/34*** | (2006.01) |

(52) U.S. Cl.

CPC ............. *F16H 48/08* (2013.01); *B60K 17/02* (2013.01); *F16H 37/0806* (2013.01); *F16H 48/24* (2013.01); *F16H 48/30* (2013.01); *F16H 63/3441* (2013.01)

(58) Field of Classification Search

CPC .......... F16H 48/08; F16H 48/24; F16H 48/30; F16H 63/3441

See application file for complete search history.

(56) References Cited

U.S. PATENT DOCUMENTS

| | | | | |
|---|---|---|---|---|
| 1,760,839 A * | 5/1930 | Drew | F16H 3/60 | 475/252 |
| 2,267,562 A | 12/1941 | Higgins | | |
| 2,962,916 A * | 12/1960 | Koelsch | B60K 17/3467 | 475/233 |
| 5,386,898 A * | 2/1995 | Weilant | B60K 23/08 | 475/86 |

(Continued)

FOREIGN PATENT DOCUMENTS

| | | | |
|---|---|---|---|
| CN | 116044962 A | 5/2023 | |
| DE | 102019108845 A1 * | 10/2020 | B60K 23/08 |
| JP | 5875128 B2 | 3/2016 | |

OTHER PUBLICATIONS

French Preliminary Search Report Issued Jan. 29, 2025 in French Application FR2407453 filed on Jul. 8, 2024, 10 pages (with English Translation of Categories & Written Opinion).

*Primary Examiner* — Farhana Pervin
(74) *Attorney, Agent, or Firm* — Oblon, McClelland, Maier & Neustadt, L.L.P.

(57) ABSTRACT

A differential module having a first axis of rotation and including a planet carrier, a planet pinion pivotably mounted on the planet carrier, and a first and a second sun gear pivoting about the first axis of rotation. Also included is a first and a second wheel-driving half-shaft, the first wheel-driving half-shaft being rotationally connected to the first sun gear. A sliding sleeve is configured to occupy, selectively, four axial positions for the coupling of the differential module.

20 Claims, 7 Drawing Sheets

(56) References Cited

U.S. PATENT DOCUMENTS

| | | | | |
|---|---|---|---|---|
| 5,890,989 | A * | 4/1999 | Yamazaki | B60K 23/08<br>192/69.82 |
| 6,432,021 | B1 * | 8/2002 | Averill | B60K 23/08<br>475/237 |
| 2003/0190992 | A1 * | 10/2003 | Holman | B60K 17/36<br>180/24.09 |
| 2005/0261099 | A1 * | 11/2005 | Bowen | F16H 48/08<br>475/205 |
| 2014/0179483 | A1 * | 6/2014 | Kahl | B60K 17/36<br>475/230 |
| 2024/0408958 | A1 * | 12/2024 | Van Der Vecht | F16H 37/082 |

* cited by examiner

DIFFERENTIAL MODULE

TECHNICAL FIELD

The present invention relates to a differential module for a vehicle transmission system.

TECHNOLOGICAL BACKGROUND

Transmission systems comprising a differential module are intended to transmit and distribute torque coming from a motor/engine to two wheel-driving half-shafts of an axle of the vehicle. The differential module comprises an input element intended to be driven by a motor/engine and an output element intended to drive one and/or the other of the two wheel-driving half-shafts of the axle of the vehicle. In order selectively to render the wheels of the vehicle free or driven, the differential module may comprise coupling means able selectively to couple the input element to the output element and/or selectively to couple the output element to one of the two wheel-driving half-shafts.

Document EP0241382 notably describes such a differential module in which the coupling means comprise a sliding sleeve constantly rotationally secured to one of the two wheel-driving half-shafts, the sliding sleeve occupying three positions: a first position in which the sliding sleeve is coupled to a shaft portion secured to an output element of the differential module, a second position in which the sliding sleeve is uncoupled from the shaft portion, and a third position in which the sliding sleeve is rotationally secured to an input element of the differential module.

The invention seeks to improve this type of device, notably by simplifying and improving the compactness of the structure of the coupling means and by adding additional functionalities thereto.

SUMMARY

Hereinafter, ordinal numerical adjectives are used to distinguish between features. They do not define the position of a feature. Consequently, for example, a third feature of a product does not mean that the product has a first and/or a second feature.

One subject of the invention is a differential module for a vehicle transmission system, the differential module having a first axis of rotation and comprising:

- a planet carrier able to receive a torque supplied, directly or indirectly, by a traction motor/engine;
- at least one planet pinion pivotably mounted on the planet carrier;
- a first and a second sun gear pivoting about the first axis of rotation;
- a first and a second wheel-driving half-shaft, the first wheel-driving half-shaft being rotationally connected to the first sun gear; and
- a sliding sleeve axially mobile along the first axis of rotation;

the sliding sleeve being configured to occupy, selectively, four axial positions:

- a connected position in which the sliding sleeve couples the second wheel-driving half-shaft to the second sun gear;
- a locked position in which the sliding sleeve couples the second wheel-driving half-shaft to the planet carrier or to the first wheel-driving half-shaft;

- a park position in which the sliding sleeve is configured to couple the second sun gear to a fixed structure, notably a housing; and
- a disconnected position in which the sliding sleeve does not couple the second wheel-driving half-shaft.

Thus, the invention offers the advantage of enabling four modes of operation of the differential module to be selected using just one single sliding sleeve.

In the connected position, it is possible to transmit torque between the traction motor/engine and the first and second wheel-driving half-shafts, by exercising the differential function that allows the two wheel-driving half-shafts to have different rotational speeds. This mode of operation is used notably when the vehicle is travelling round a bend.

In the disconnected position, the transmission of torque between the traction motor/engine and the first and second wheel-driving half-shafts is disconnected. This mode of operation is used notably in phases of use of the vehicle in which the wheels of an axle do not need to be driven. This makes it possible to improve the overall efficiency of the vehicle drivetrain by eliminating the mechanical losses associated with the rotation of the various components not being used.

In the locked position, the relative movement between the first and second sun gears is blocked, and the first and second wheel-driving half-shafts are forced to rotate at the same speed as the planet carrier. This mode of operation is used notably in order to avoid the risks of loss of grip or of slipping of the vehicle when the two opposing wheels of the vehicle are faced with a difference in friction against the roadway.

In the park position, the movement of the second wheel-driving half-shaft is completely blocked. This mode of operation is notably used to immobilize the vehicle when parked.

Within the meaning of the present invention:

- "axially" means "parallel to the first axis of rotation";
- "radially" means "along an axis belonging to a plane orthogonal to the first axis of rotation and intersecting this first axis of rotation";
- the terms "external" and "internal" are used to define the relative position of a component or of a portion of a component with respect to the axis of rotation, with which it is concentric; a component near said axis is thus described as internal as opposed to an external component situated radially towards the periphery;
- two components are said to be "rotationally connected" or "coupled" when they are assembled in such a way that one cannot rotate with respect to the other. In other words, this is a rotationally secured connection, possibly with a small amount of slop such as spline backlash. This rotational securing may be achieved by securing the first component to the second component directly or via one or more intermediate components.

According to one additional feature of the invention, each of the couplings achieved in the four positions of the sliding sleeve are achieved by coupling means selected from claw-clutches, single-disc or multi-disc friction clutches, toothed connections, key/keyway connections or pinned connections.

According to one aspect of the invention, the four axial positions of the sliding sleeve succeed one another in a first determined sequence as the sliding sleeve progressively moves away from the first sun gear, the locked position being the position closest to the first sun gear, the connected position then succeeding the locked position, the disconnected position then succeeding the connected position and the park position then succeeding the disconnected position.

This first determined sequence makes the transition from one position to another more efficient and more reliable. Specifically, the transition to the park position is advantageously performed from the disconnected position so as to limit the relative speed between the sliding sleeve and the fixed structure and therefore reduce shocks and overtorques in the coupling phase.

In addition, as the connected position corresponds to the mode of operation most frequently used on a vehicle, it is advantageous for this connected position to be located between the locked position and the disconnected position so as to limit the sliding sleeve distance travelled and movement time needed in order to reach one or the other of these latter two positions.

According to another aspect of the invention, the four axial positions of the sliding sleeve succeed one another in a second determined sequence as the sliding sleeve progressively moves away from the first sun gear, the locked position being the position closest to the first sun gear, the disconnected position then succeeding the locked position, the connected position then succeeding the disconnected position and the park position then succeeding the connected position.

According to an additional feature of the invention, a number of active positions comprised between two and four is selected from among the four positions of the sliding sleeve so that only the active positions thus selected are used during operation of the differential module on a vehicle, the number of positions selected being predetermined according to the requirements of each vehicle application.

Specifically, the disposition of the aforementioned four positions also enables the differential module according to the invention to be used unmodified even if, according to the requirements of a vehicle application, the locked position and/or the park position are not needed.

According to one aspect of the invention, the differential module comprises:

- a first connection by means of collaborating shapes by means of which the sliding sleeve is permanently rotationally connected to the second sun gear and by means of which the sliding sleeve slides axially with respect to the second sun gear;
- a second connection by means of collaborating shapes by means of which the sliding sleeve is coupled to the second wheel-driving half-shaft in the connected and locked positions, and by means of which the sliding sleeve is uncoupled from the second wheel-driving half-shaft in the disconnected position;
- a third connection by means of collaborating shapes by means of which the sliding sleeve is configured to be coupled to a fixed structure, notably a housing, in the park position, and by means of which the sliding sleeve is configured to be uncoupled from the fixed structure in the connected, disconnected and locked positions; and
- a fourth connection by means of collaborating shapes by means of which the sliding sleeve is coupled to the planet carrier or to the first wheel-driving half-shaft in the locked position, and by means of which the sliding sleeve is uncoupled from the planet carrier and from the first wheel-driving half-shaft in the disconnected, connected and park positions.

In the differential-module architecture according to this last feature, the sliding sleeve collaborates directly and permanently with the second sun gear, unlike in a commonplace architecture of the prior art in which a shaft portion is needed for connecting the sliding sleeve to the second sun gear. This architecture is therefore simpler and more economical.

In addition, with this architecture, it becomes possible to cause the sliding sleeve to slide axially through the second sun gear so as to be able to access the first wheel-driving half-shaft directly and thus achieve coupling in the locked position in a way that is simple and compact. The coupling of the sliding sleeve may equally well involve coupling the sliding sleeve and the first wheel-driving half-shaft, or coupling the sliding sleeve and the first planet pinion.

Each connection by means of collaborating shapes in the present invention comprises a first shape formed on the sliding sleeve and a complementing second shape formed on another component so that said component collaborates rotationally with the sliding sleeve as a result of said connection by means of collaborating shapes.

According to an additional feature of the invention:

- the first connection by means of collaborating shapes comprises a first toothset of the radially oriented external toothset type, formed on the sliding sleeve, the first toothset notably being splines; and/or
- the second connection by means of collaborating shapes comprises a second toothset of the radially oriented internal toothset type, the second toothset being formed in a cavity of the sliding sleeve that accepts a portion of the second wheel-driving half-shaft; and/or
- the third connection by means of collaborating shapes comprises a third toothset of the dog clutch type formed on the sliding sleeve with the teeth directed axially; and/or
- the fourth connection by means of collaborating shapes comprises a fourth toothset of the dog clutch type formed on the sliding sleeve with the teeth directed axially.

Toothsets of the dog clutch type constitute a simple and robust means of coupling that enables the sliding sleeve to be coupled/uncoupled quickly.

According to another aspect of the invention, the differential module comprises:

- a fifth connection by means of collaborating shapes by means of which the sliding sleeve is permanently rotationally connected to the second wheel-driving half-shaft and by means of which the sliding sleeve slides axially with respect to the second wheel-driving half-shaft;
- a sixth connection by means of collaborating shapes by means of which the sliding sleeve is coupled to the second sun gear in the connected and locked positions, and by means of which the sliding sleeve is uncoupled from the second sun gear in the disconnected position;
- a seventh connection by means of collaborating shapes by means of which the sliding sleeve is configured to be coupled to a fixed structure, notably a housing, in the park position, and by means of which the sliding sleeve is configured to be uncoupled from the fixed structure in the connected, disconnected and locked positions; and
- an eighth connection by means of collaborating shapes by means of which the sliding sleeve is coupled to the planet carrier in the locked position, and by means of which the sliding sleeve is uncoupled from the planet carrier in the disconnected, connected and park positions.

According to an additional feature of the invention:

- the fifth connection by means of collaborating shapes comprises a fifth toothset of the radially oriented internal toothset type, formed on the sliding sleeve, the fifth toothset notably being splines; and/or
- the sixth connection by means of collaborating shapes comprises a sixth toothset of the radially oriented internal toothset type formed on the sliding sleeve; and/or
- the seventh connection by means of collaborating shapes comprises a seventh toothset of the dog clutch type formed on the sliding sleeve with the teeth directed axially; and/or
- the eighth connection by means of collaborating shapes comprises an eighth toothset of the dog clutch type formed on the sliding sleeve with the teeth directed axially.

According to an additional feature of the invention, the fifth toothset and the sixth toothset are formed on the one same spline of the sliding sleeve.

According to an additional feature of the invention, the sixth toothset is coupled to the second sun gear via a splined shaft portion.

According to an additional feature of the invention, all of the aforementioned toothsets of the claw-clutch type may be toothsets of a type that impedes unwanted disengagement.

As is known from the prior art, toothsets of the claw-clutch type designed to impede unwanted disengagement have undercuts and counter-undercuts with angles selected so as to ensure that the teeth cannot spontaneously disengage while they are transmitting torque, avoiding untimely disconnection.

In general, all of the aforementioned toothsets may, in other embodiments of the invention, be of axial or radial type, at no angle, or at an angle that encourages the toothsets to engage while they are transmitting torque or, on the other hand, at an angle that encourages the toothsets to disengage while they are not transmitting torque.

According to an additional feature of the invention, one surface of the planet carrier provides radial centring of a surface of the sliding sleeve.

This latter feature ensures sufficient axial guidance of the sliding sleeve over the entirety of its travel.

According to an additional feature of the invention, any radial and axial guidance means is formed between the sliding sleeve and the planet carrier, the guidance means comprising a journal bearing or a sliding coating or a rolling bearing.

The latter feature ensures sufficient axial guidance of the sliding sleeve over the entirety of its travel, while at the same time limiting friction and therefore the force that the actuator has to supply in order to move the sliding sleeve into the four positions.

According to an additional feature of the invention, the sliding sleeve is designed to be moved by an actuator, the sliding sleeve notably comprising an annular groove that collaborates with a fork connected to the actuator.

The invention enables the sliding sleeve to be moved into the aforementioned four positions using just a single actuator.

According to an additional feature of the invention, a first assistance spring is designed to exert an axial force on the sliding sleeve in order to encourage it to move into the connected position and/or to move into the locked position.

According to an additional feature of the invention, a second assistance spring is designed to exert an axial force on the sliding sleeve in order to encourage it to move into the park position.

For the previous two features, “encouraging it to move” means that, as the sliding sleeve moves from one position to another, when it so happens that the mating toothsets are mutually angularly offset in such a way that they cannot immediately come into mutual engagement with one another, the assistance spring compresses and applies a force to the sliding sleeve. As soon as the relative rotation of the toothsets places these toothsets in a position in which they can come into mutual engagement with one another, the spring, relaxing, assists the sliding sleeve in positioning itself in its new position. The spring thus accelerates the mutual engagement of the mating toothsets, which improves the dynamics of the differential module. Indeed, the spring can move the connection sliding sleeve more quickly than an actuator can alone since the inertia of the spring is lower.

According to a first aspect of the invention:

- the sliding sleeve comprises two parts that are axially mobile relative to one another;
- the first part being configured to collaborate with the actuator;
- the second part being configured to provide coupling, selectively, in the locked, connected, disconnected and park positions; and
- the first and second assistance springs being interposed axially between the first and second parts.

According to an additional feature of the invention, the first part of the sliding sleeve is centred radially on the second part of the sliding sleeve.

According to an additional feature of the invention, the first part of the sliding sleeve is rotationally connected to the second part of the sliding sleeve, notably by teeth.

According to an additional feature of the invention, the first assistance spring is positioned axially on a first side of the first part of the sliding sleeve and the second assistance spring is positioned axially on a second side of the first part of the sliding sleeve, the first side being axially closer to the first sun gear than the second side.

According to another aspect of the invention, the first assistant spring and the second assistance spring are interposed axially between the sliding sleeve and a fork connected to the actuator.

According to an additional feature of the invention, the first assistance spring and/or the second assistance spring are of the helical spring or crinkle washer or frustoconical Belleville spring washer or elastomer-spring type.

The invention further relates to a transmission system comprising a fixed structure, notably a housing, the differential module according to the invention, a gearset configured to cause the differential module to collaborate rotationally with a traction motor/engine, and an actuator configured to move the sliding sleeve in sequence into the four, locked, connected, disconnected and park, positions.

The differential module according to the invention may have one or other of the features described below, in combination with each other or taken independently of each other:

- the at least one planet pinion and the two sun gears may be bevel gears;
- the at least one planet pinion is pivotably mounted on a cylindrical shaft fixed to the planet carrier;

- the at least one planet pinion and the two sun gears may be produced in the form of cylindrical gears, notably straight-cut spur gears, notably gears in the form of an epicyclic gearset;
- the differential module may be of the limited-slip differential type in which a friction device is arranged to create a torque offset between two wheels connected to the differential module, notably in the connected mode;
- the at least one planet pinion and the two sun gears may be produced in the form of worm gears, it being possible notably for the differential module to be of the "Torsen" type;
- the number of planet pinions is comprised between one and twelve;
- the planet carrier may be produced in the form of a cage comprising an internal cavity in which the at least one planet pinion and the two sun gears are housed;
- the two sun gears are supported and rotationally guided by the cage;
- the cage may be produced in several parts, joined together by a fixing means, notably by welding or by screw-fastening or by riveting;
- a gear wheel is attached to the planet carrier, the gear wheel receiving, via a gearset, the torque supplied by a traction motor/engine.

The transmission mechanism according to the invention may have one or another of the features described below, in combination with each other or taken independently of each other:

- the fixed structure may be a housing of the transmission system;
- the housing of the transmission system may be intended to house the gearset and the differential module;
- the gearset may comprise cylindrical gears with parallel axis systems;
- the gearset may comprise at least one epicyclic gearset;
- the actuator may be of mechanical, electromechanical, electromagnetic, pneumatic or else hydraulic type;
- the actuator may comprise a recirculating-balls system or a ball-screw system or a selector drum system.

The invention further relates to a powertrain comprising a traction motor/engine and a torque-transmission system as defined above.

The fixed structure may be a housing of the powertrain, notably a traction motor housing/engine crankcase.

DESCRIPTION OF THE EMBODIMENTS

Throughout the figures, elements that are identical or perform the same function bear the same reference numbers. The following embodiments are examples. Although the description refers to one or more embodiments, this does not necessarily mean that each reference relates to the same embodiment, or that the features apply only to one embodiment. Individual features of different embodiments can also be combined or interchanged in order to provide other embodiments.

Figure 1:
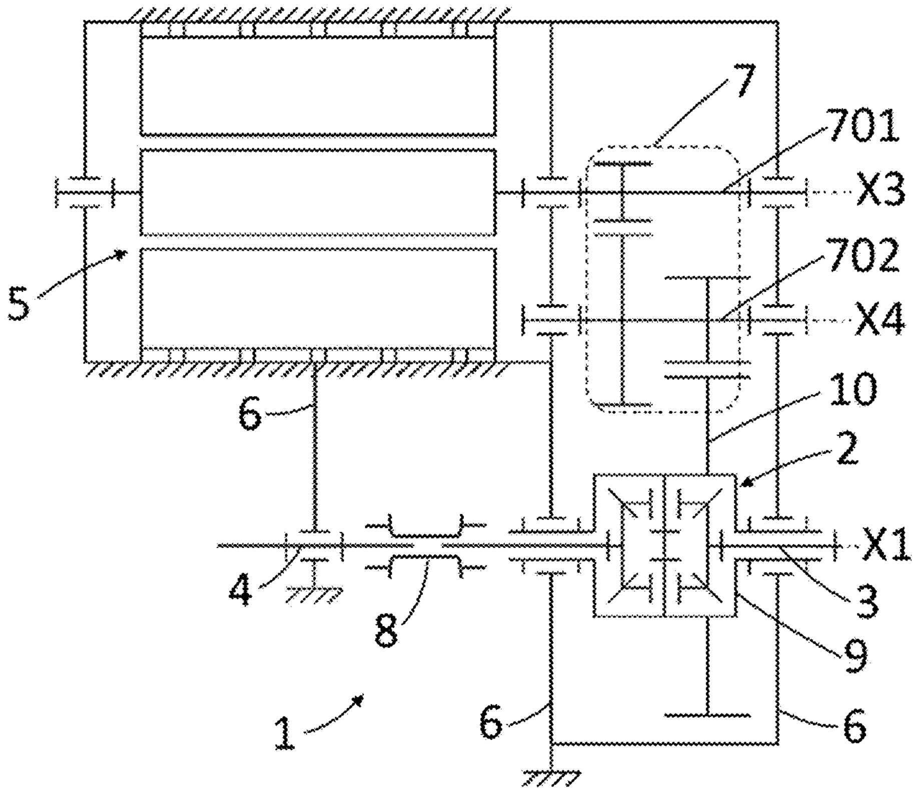
FIG. 1 is a schematic cross-sectional view of a powertrain comprising a differential module according to the invention.
Figure 2:
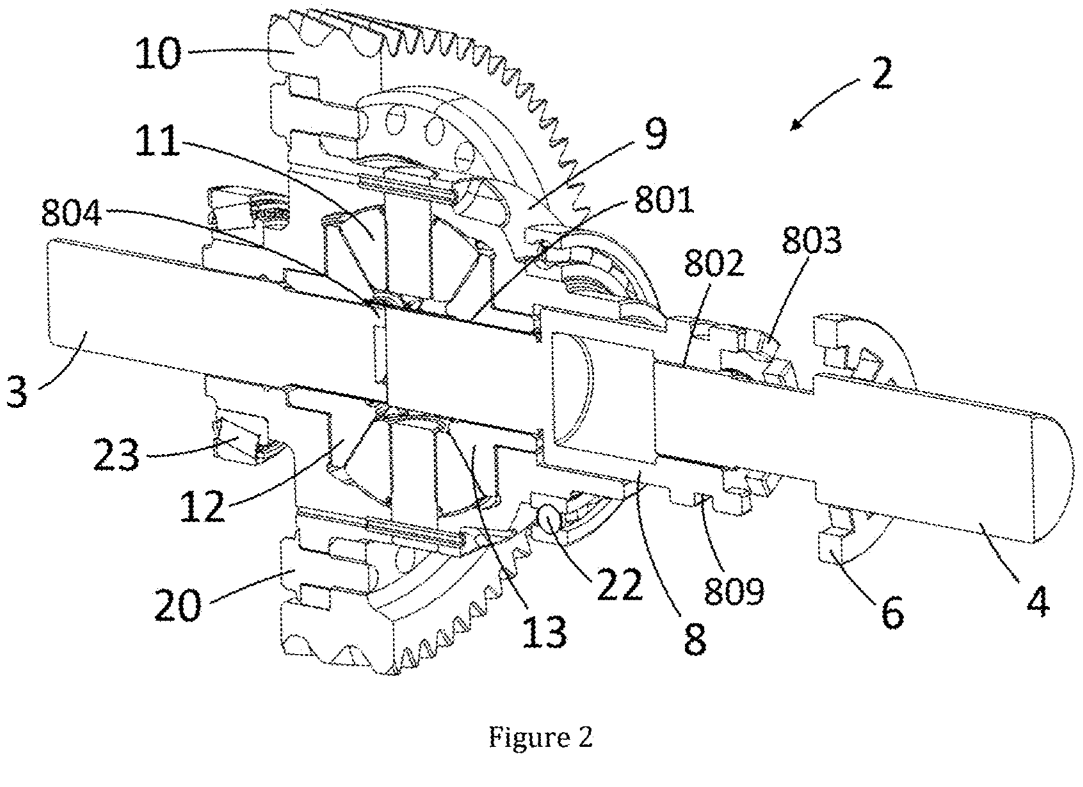
FIG. 2 is a sectioned perspective view of the differential module according to a first embodiment of the invention.

FIG. 1 schematically illustrates a powertrain 1 according to one embodiment of the invention. The powertrain 1 comprises a differential module 2 is intended to set into rotation two wheel-driving half-shafts 3, 4 of an axle of a vehicle and is configured to distribute torque coming from a traction motor/engine 5, to the wheel-driving half-shafts 3, 4, allowing them to rotate at different speeds.

Such a differential module 2 is intended, for example, for a hybrid vehicle. Thus, the powertrain 1 is able, for example, to transmit torque from an electric motor to a rear or front axle of the vehicle, while another powertrain, coupled to another motor/engine, such as a combustion engine, is able to generate torque and transmit it between this other motor/engine and the wheel-driving half-shafts 3, 4 of the other axle of the vehicle. Another powertrain configuration for a hybrid vehicle may consist in combining a combustion engine and an electric motor both of them combined in such a way as to transmit torque to the wheel-driving half-shafts 3, 4 of the one same axle. The vehicle also can be fully electric.

As may be seen in FIG. 1, the powertrain 1 comprises a transmission housing 6 in which a traction motor/engine 5, a differential module 2 and a gearset 7 are housed. The structure of the transmission housing 6 may be a one-piece structure or may be made up of several sub-parts. The traction motor/engine 5 at its output comprises a shaft rotating about a third axis of rotation X3. The gearset 7 collaborates kinematically in rotation with, on the one hand, the shaft of the traction motor/engine 5 and, on the other hand, the differential module 2 so as to form one or more speed-reduction ratios.

In the nonlimiting example of FIG. 1, the gearset 7 comprises a first geartrain 701 of cylindrical gears, which is coaxial with the third axis of rotation X3 and collaborates kinematically in rotation with a second geartrain 702 of cylindrical gears which is coaxial with a fourth axis of rotation X4 parallel to the third axis of rotation X3, to form a first reduction ratio. The second geartrain 702 of cylindrical gears collaborates kinematically in rotation with a gear wheel 10 secured to a cage 9 of the differential module 2 to form a second reduction ratio.

In this example, the traction motor/engine 5 may be an electric motor or a combustion engine. Another electric motor or combustion engine (not depicted) may additionally be coupled to one of the gears of the gearset 7.

FIGS. 1 to 6 illustrate a differential module 2 according to a first embodiment of the invention, the differential module 2 having a first axis of rotation X1 and comprising a planet carrier 9 able to receive a torque supplied directly or indirectly by a traction motor/engine 5, at least one planet pinion 11 pivotably mounted on the planet carrier 9, a first and a second sun gear 12, 13 pivoting about the first axis of rotation X1 and meshing with the at least one planet pinion 11, a first and a second wheel-driving half-shaft 3, 4, the first wheel-driving half-shaft 3 being rotationally connected to the first sun gear 12, and a sliding sleeve 8 able to move axially along the first axis of rotation X1.

In this embodiment, the planet carrier 9 may be in the form of a cage forming a cavity that houses and supports the planet pinions 11 and the sun gears 12, 13. The planet pinions 11 and the first and second sun gears 12, 13 are in this instance bevel gears. A cylindrical rod 902 may be fixed to the cage 9, the planet pinions 11 being pivot mounted about the second axis of rotation X2 on said cylindrical rod 902. There may be from one to four of the planet pinions 11, electing to have four of them offering the advantage that the torque can be transmitted through planet pinions of smaller dimensions. The second axis of rotation X2 is perpendicular to the first axis of rotation X1. The first sun gear 12 may be mounted on, and connected in terms of rotation to, the wheel-driving half-shaft 3 via a spline 1201. The gear wheel 10 may be fixed to the planet carrier 9 by fixing screws 20. The planet carrier 9 may be supported by the transmission housing 6 via a first bearing 22, in this instance a ball bearing, and a second bearing 23, in this instance a tapered roller bearing.

The differential module 2 described hereinabove corresponds to a design of differential in its most commonplace form. According to another embodiment of the invention, not depicted, the differential may be of the "flat differential" type in which the planet pinions and the sun gears are produced in the form of cylindrical gears, notably spur gears with straight-cut teeth, notably gears arranged in the form of an epicyclic gearset.

Figure 3:
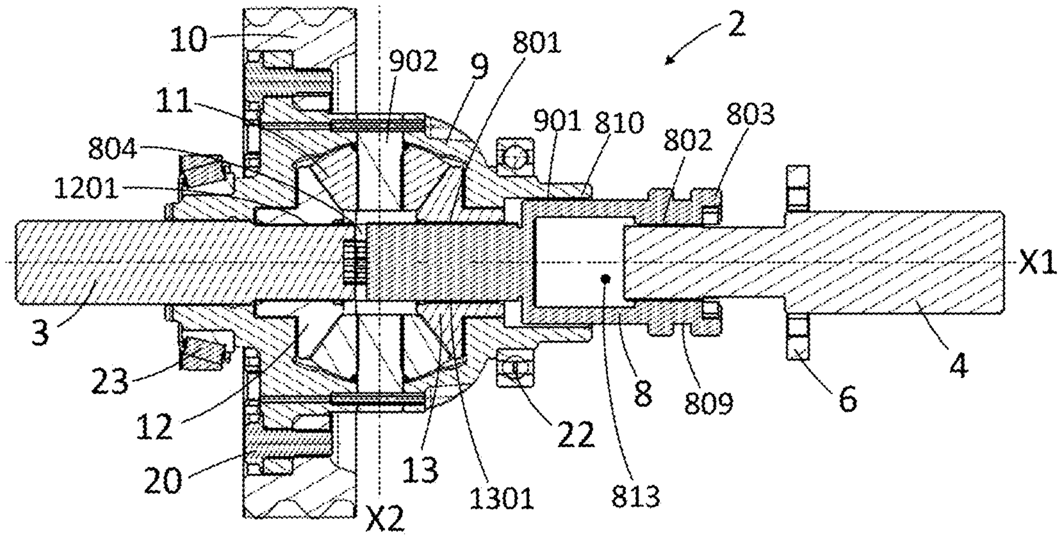
FIG. 3 is a cross-sectional view of the differential module in the connected position according to a first embodiment of the invention.
Figure 4:
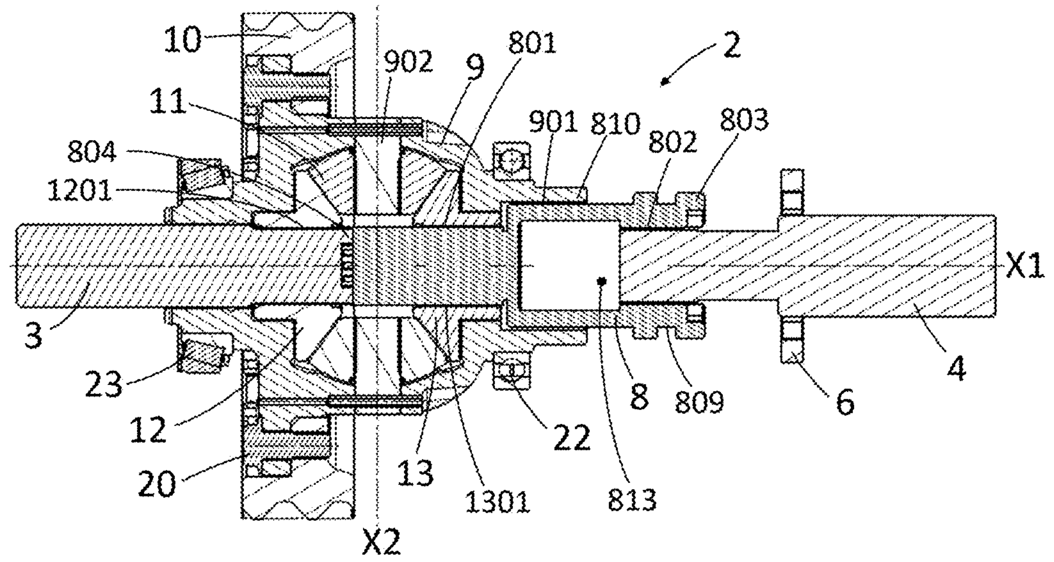
FIG. 4 is a cross-sectional view of the differential module in the locked position according to a first embodiment of the invention.
Figure 5:
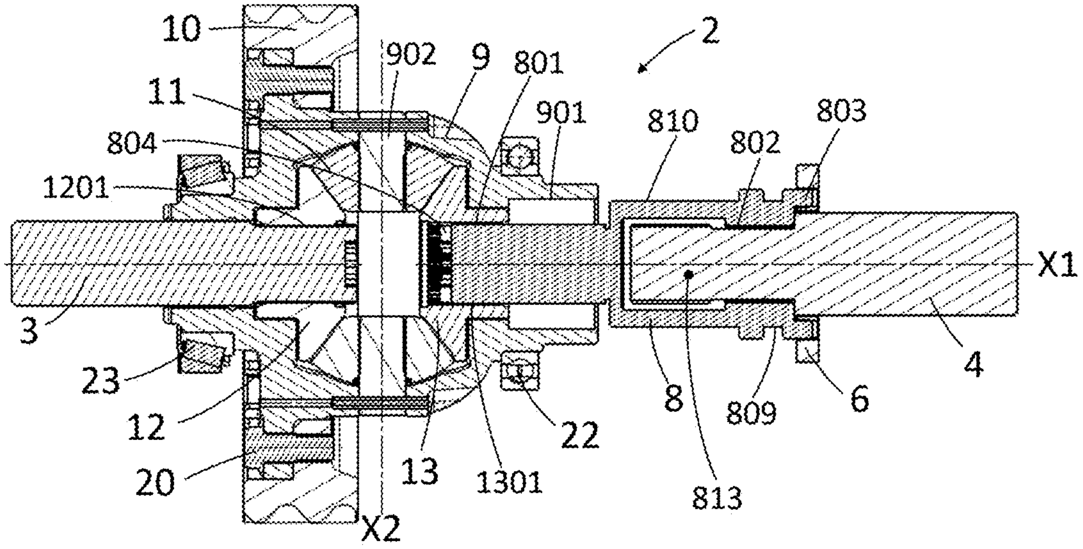
FIG. 5 is a cross-sectional view of the differential module in the park position according to a first embodiment of the invention.
Figure 6:
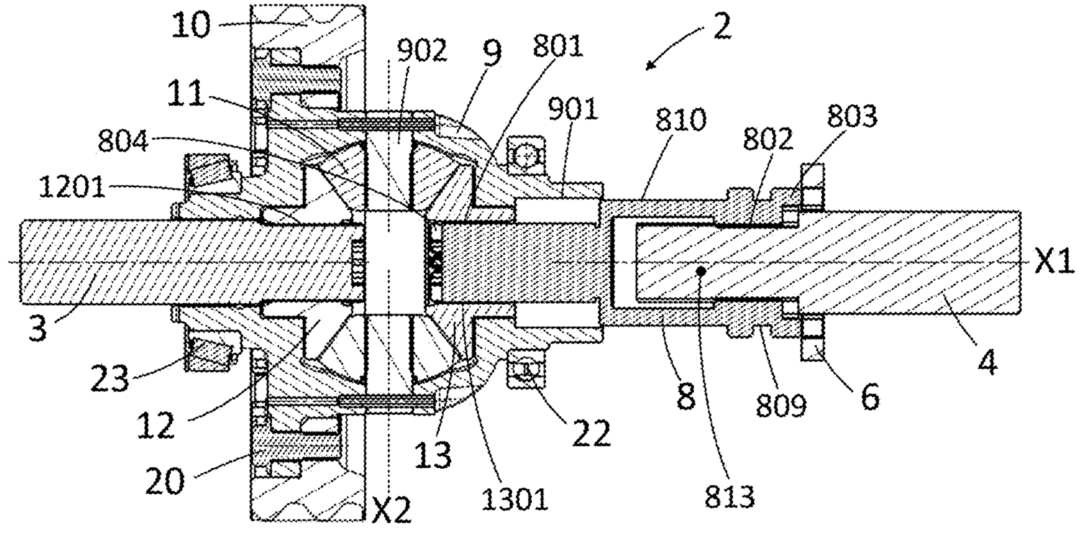
FIG. 6 is a cross-sectional view of the differential module in the disconnected position according to a first embodiment of the invention.
Figure 7:
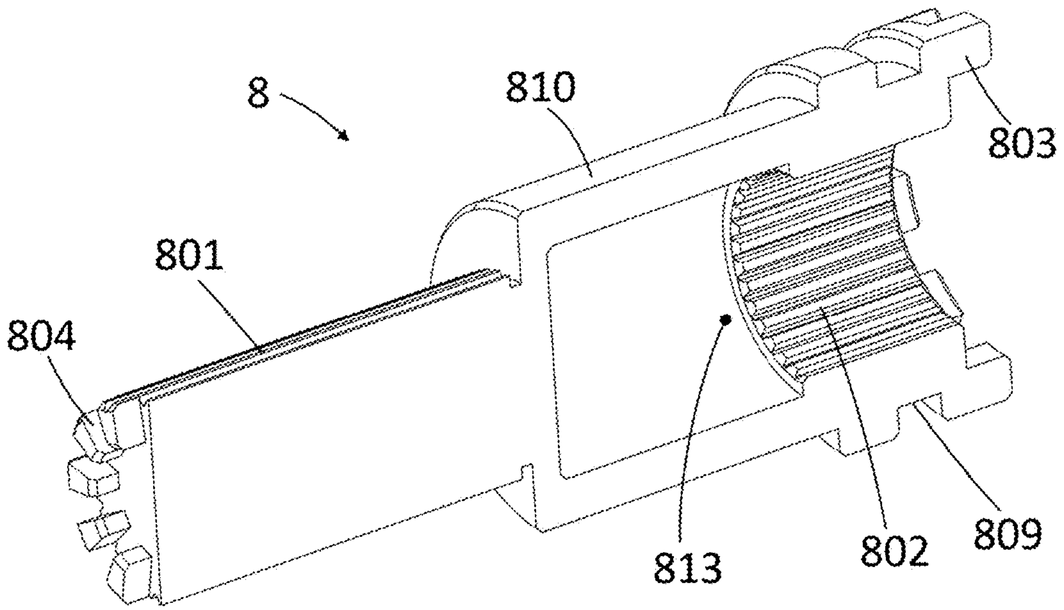
FIG. 7 is a sectioned perspective view of the sliding sleeve according to a first embodiment of the invention.

The sliding sleeve 8 is configured to occupy, selectively, four axial positions: a connected position illustrated in FIG. 3, a locked position illustrated in FIG. 4, a park position illustrated in FIG. 5, and a disconnected position illustrated in FIG. 6. In the connected position, the sliding sleeve 8 couples the second wheel-driving half-shaft 4 to the second sun gear 13. In the locked position, the sliding sleeve 8 couples the second wheel-driving half-shaft 4 to the first wheel-driving half-shaft 3. In the park position, the sliding sleeve 8 is configured to couple the second sun gear 13 to a fixed structure, which in this instance is the transmission housing 6. In the disconnected position, the sliding sleeve 8 does not couple the second wheel-driving half-shaft 4.

The sliding sleeve 8 is designed to be moved by an actuator (not depicted). The sliding sleeve 8 may comprise an annular groove 809 that collaborates with a fork (not depicted) connected to the actuator. Only one single actuator is needed for moving the sliding sleeve into the four positions.

To make it easier for the sliding sleeve 8 to slide axially over part or the entirety of its travel, an internal surface 901 of the planet carrier 9 may provide radial centring of a radially external surface 810 of the sliding sleeve 8.

As illustrated by FIGS. 3 to 6, the four axial positions of the sliding sleeve 8 may succeed one another in a determined sequence as the sliding sleeve 8 progressively moves away from the first sun gear 12, the locked position being the position closest to the first sun gear 12, the connected position then succeeding the locked position, the disconnected position then succeeding the connected position and the park position then succeeding the disconnected position.

As illustrated in the first embodiment of FIGS. 2 to 6, the differential module 2 may comprise:

- a first connection by means of collaborating shapes by means of which the sliding sleeve 8 is permanently rotationally connected to the second sun gear 13 and by means of which the sliding sleeve 8 slides axially with respect to the second sun gear 13;
- a second connection by means of collaborating shapes by means of which the sliding sleeve 8 is coupled to the second wheel-driving half-shaft 4 in the connected and locked positions, and by means of which the sliding sleeve 8 is uncoupled from the second wheel-driving half-shaft 4 in the disconnected position;
- a third connection by means of collaborating shapes by means of which the sliding sleeve 8 is configured to be coupled to a fixed structure, in this instance the transmission housing 6, in the park position, and by means of which the sliding sleeve 8 is uncoupled from the fixed structure in the connected, disconnected and locked positions; and
- a fourth connection by means of collaborating shapes by means of which the sliding sleeve 8 is coupled to the first wheel-driving half-shaft 3 in the locked position, and by means of which the sliding sleeve 8 is uncoupled from the first wheel-driving half-shaft 3 in the disconnected, connected and park positions.

In the first embodiment of FIGS. 2 to 7:

- the first connection by means of collaborating shapes may comprise a first toothset 801 of the radially oriented external toothset type formed on the sliding sleeve 8, the first toothset 801 here being male splines that collaborate with female splines 1301 formed on the second sun gear 13;
- the second connection by means of collaborating shapes may comprise a second toothset 802 of the radially oriented internal toothset type, the second toothset 802 being formed in a cavity 813 of the sliding sleeve 8 that accepts a portion of the second wheel-driving half-shaft 4;
- the third connection by means of collaborating shapes may comprise a third toothset 803 of the dog clutch type formed on the sliding sleeve 8 with the teeth directed axially;
- the fourth connection by means of collaborating shapes may comprise a fourth toothset 804 of the dog clutch type formed on the sliding sleeve 8 with the teeth directed axially.

Figure 8:
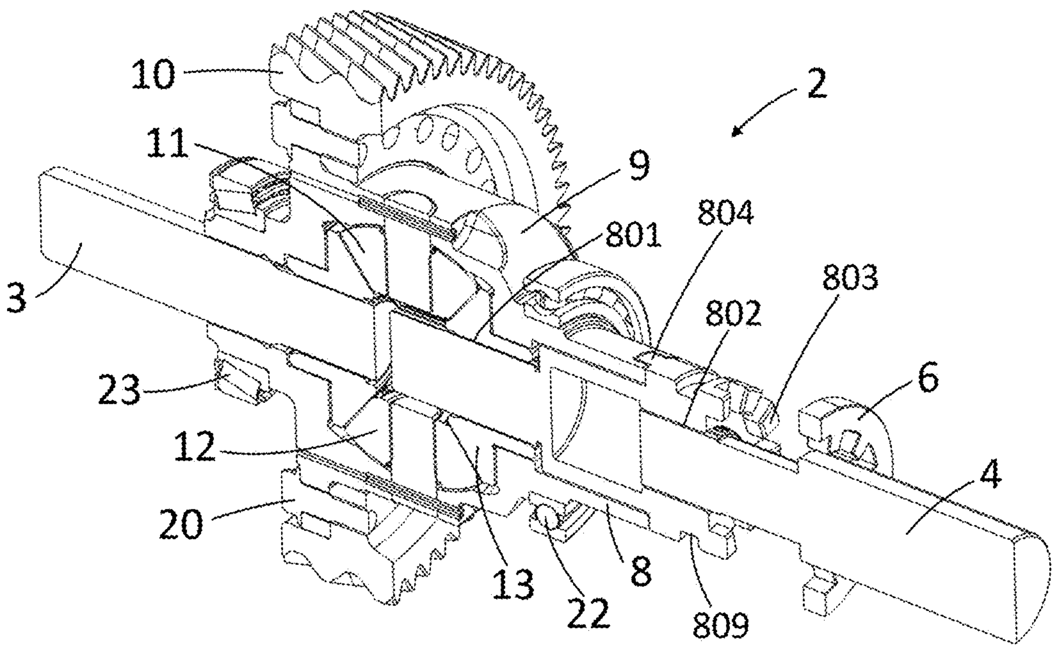
FIG. 8 is a sectioned perspective view of the differential module according to a second embodiment of the invention.
Figure 9:
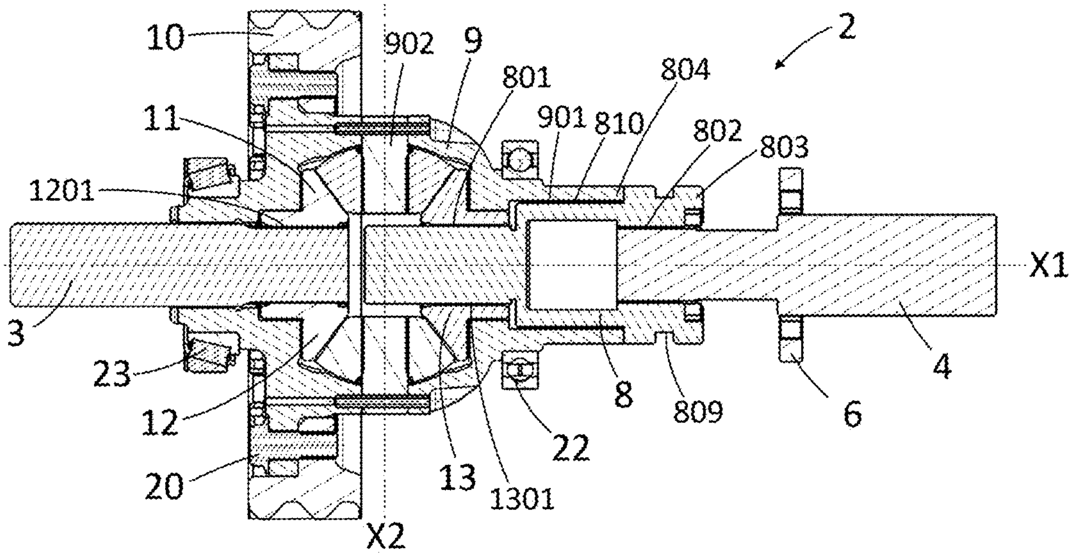
FIG. 9 is a cross-sectional view of the differential module in the locked position according to a second embodiment of the invention.
Figure 10:
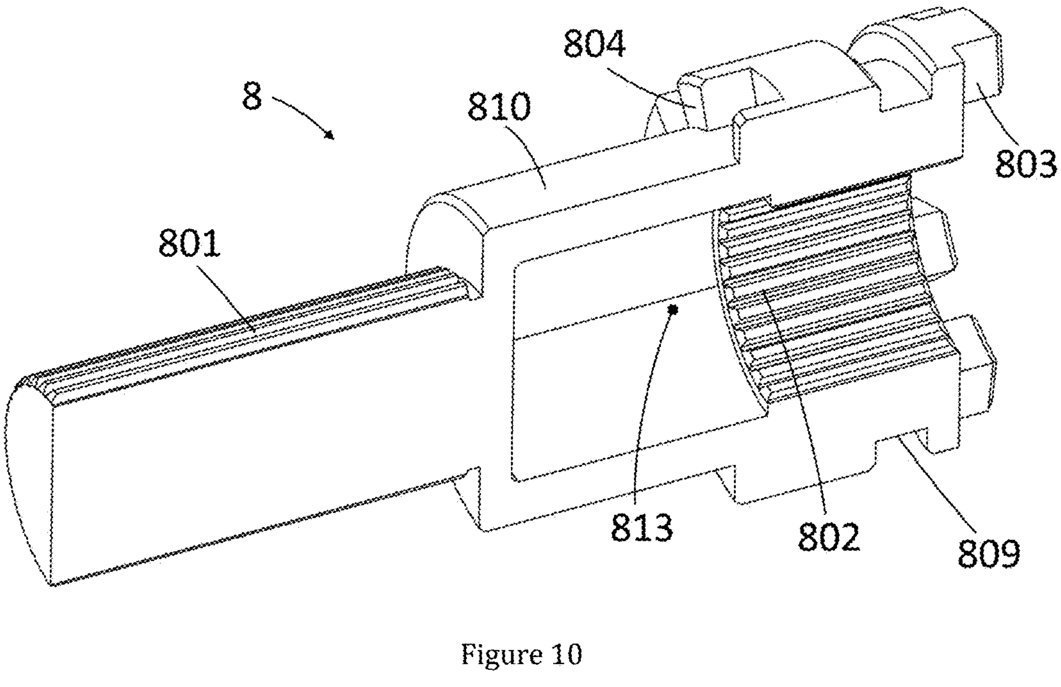
FIG. 10 is a sectioned perspective view of the sliding sleeve according to a second embodiment of the invention.

FIGS. 8 to 10 illustrate a second embodiment of the differential module 2 which differs from the first embodiment in that the fourth connection by means of collaborating shapes is produced in such a way that the sliding sleeve 8 is coupled to the planet carrier 9 in the locked position, and by means of which the sliding sleeve 8 is uncoupled from the planet carrier 9 in the disconnected, connected and park positions. The fourth connection by means of collaborating shapes comprises a fourth toothset 804 of the dog clutch type formed on the sliding sleeve 8 with the teeth directed axially.

Figure 11:
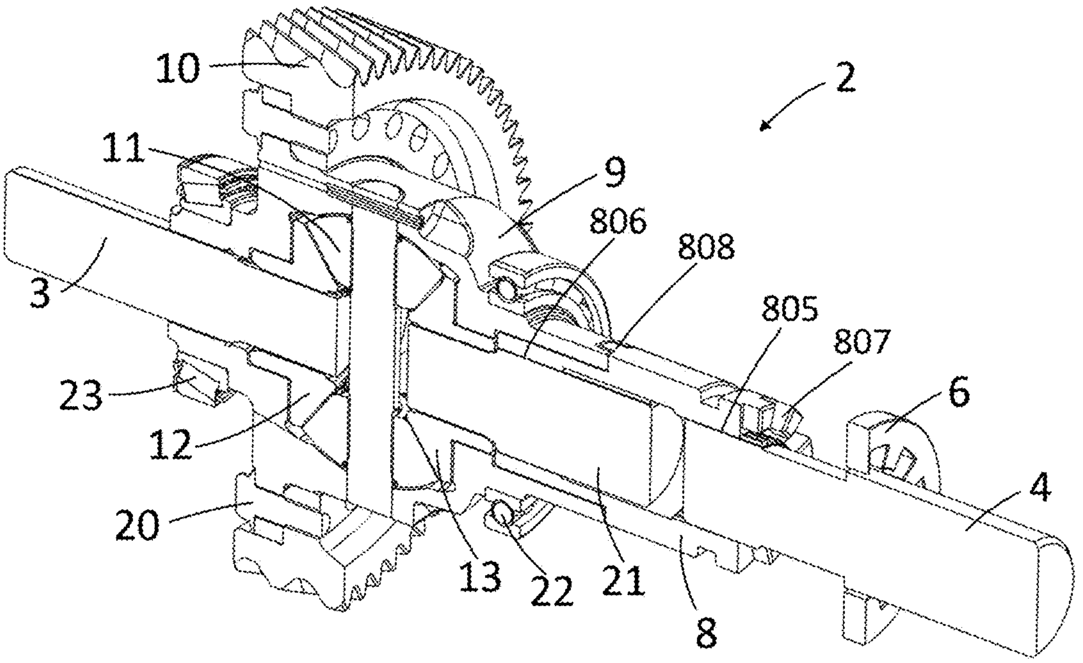
FIG. 11 is a sectioned perspective view of the differential module according to a third embodiment of the invention.
Figure 12:
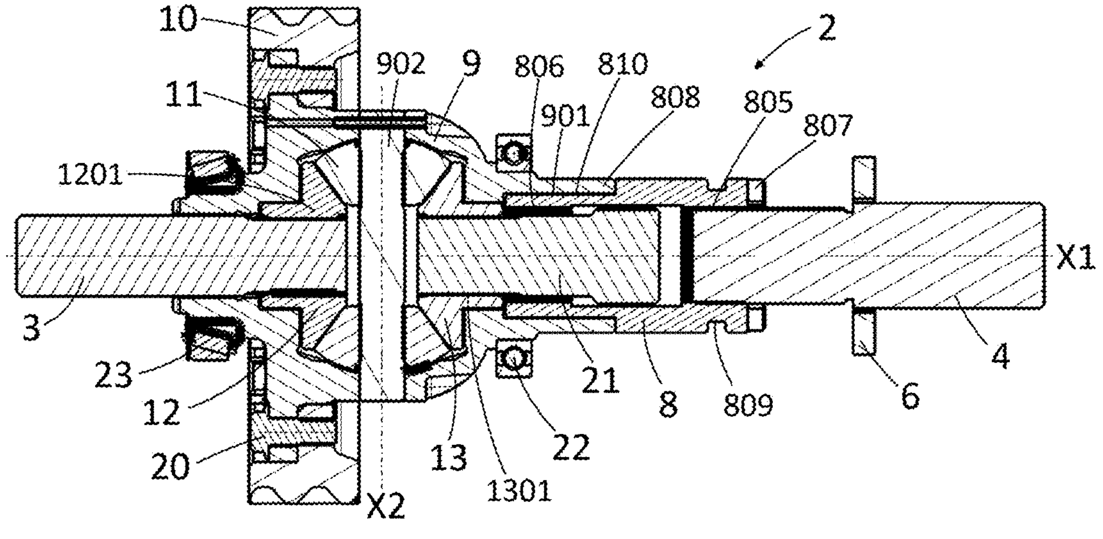
FIG. 12 is a cross-sectional view of the differential module in the locked position according to a third embodiment of the invention.
Figure 13:
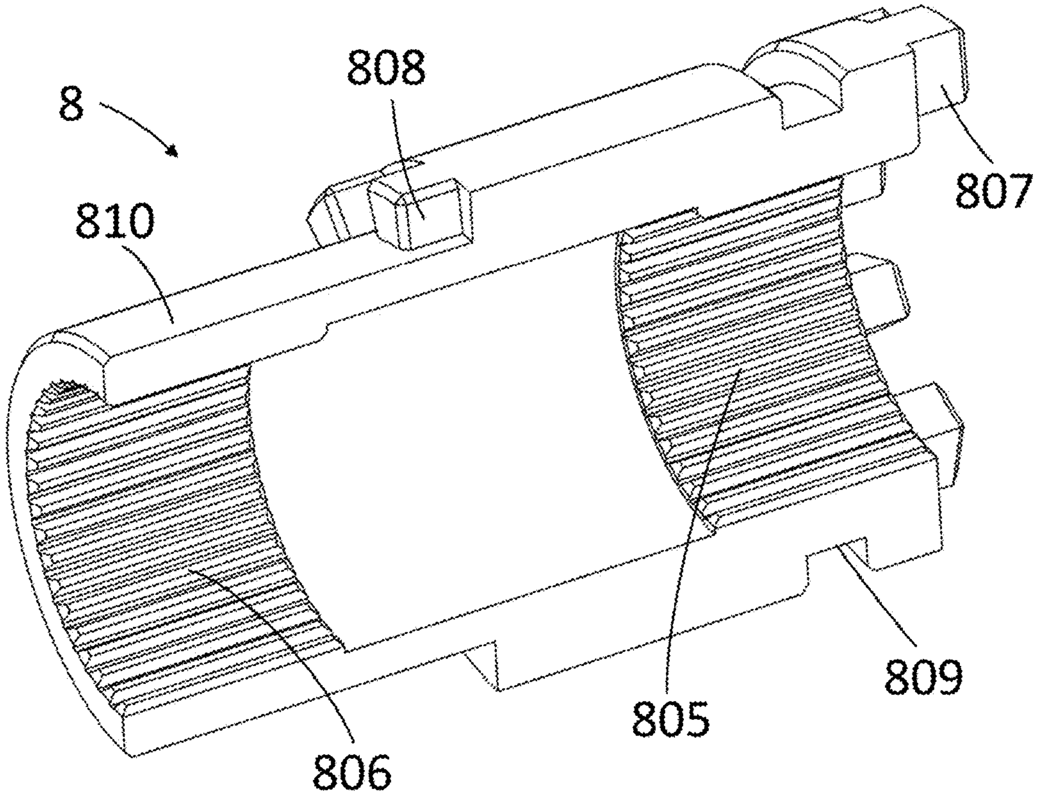
FIG. 13 is a sectioned perspective view of the sliding sleeve according to a third embodiment of the invention.

As illustrated in a third embodiment of FIGS. 11 to 13, the differential module 2 may comprise:

- a fifth connection by means of collaborating shapes by means of which the sliding sleeve 8 is permanently rotationally connected to the second wheel-driving half-shaft 4 and by means of which the sliding sleeve 8 slides axially with respect to the second wheel-driving half-shaft 4;
- a sixth connection by means of collaborating shapes by means of which the sliding sleeve 8 is coupled to the second sun gear 13 in the connected and locked positions, and by means of which the sliding sleeve 8 is uncoupled from the second sun gear 13 in the disconnected position;
- a seventh connection by means of collaborating shapes by means of which the sliding sleeve 8 is configured to be coupled to a fixed structure, in this instance the transmission housing 6, in the park position, and by means of which the sliding sleeve 8 is uncoupled from the fixed structure in the connected, disconnected and locked positions; and
- an eighth connection by means of collaborating shapes by means of which the sliding sleeve 8 is coupled to the planet carrier 9 in the locked position, and by means of which the sliding sleeve 8 is uncoupled from the planet carrier 9 in the disconnected, connected and park positions.

In the third embodiment of FIGS. 11 to 13:

- the fifth connection by means of collaborating shapes may comprise a fifth toothset 805 of the radially oriented internal toothset type, formed on the sliding sleeve 8, the fifth toothset 805 notably being splines;
- the sixth connection by means of collaborating shapes may comprise a sixth toothset 806 of the radially oriented internal toothset type formed on the sliding sleeve 8;
- the seventh connection by means of collaborating shapes may comprise a seventh toothset 807 of the dog clutch type formed on the sliding sleeve 8 with the teeth directed axially;
- the eighth connection by means of collaborating shapes may comprise an eighth toothset 808 of the dog clutch type formed on the sliding sleeve 8 with the teeth directed axially.

In the third embodiment of FIGS. 11 to 13, the sixth toothset 806 may be coupled to the second sun gear 13 via a splined shaft portion 21.

Figure 14:
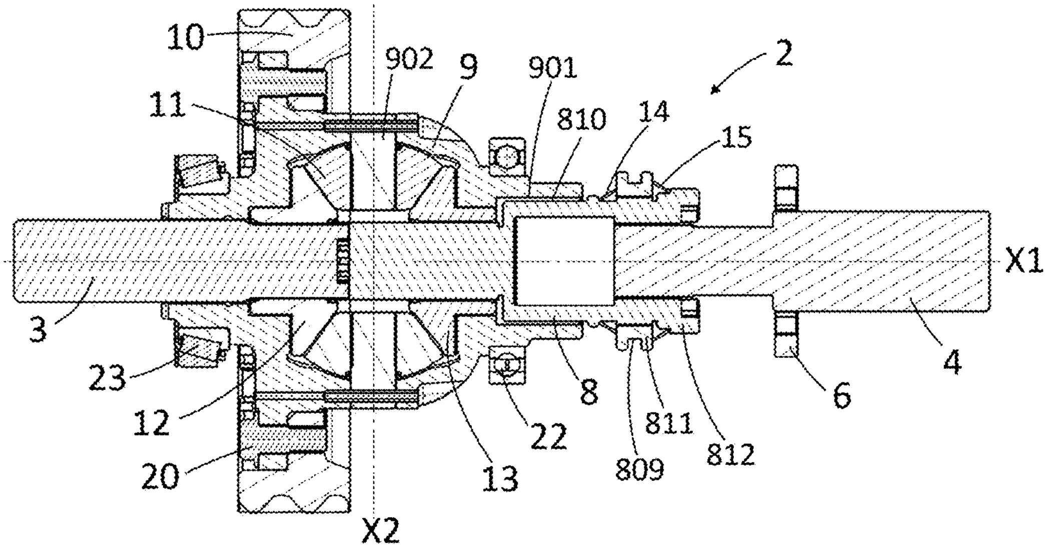
FIG. 14 is a cross-sectional view of the differential module in the locked position according to a fourth embodiment of the invention.

FIG. 14 illustrates a fourth embodiment of the differential module 2 which differs from the first embodiment in that a first assistance spring 14 may be designed to exert an axial force on the sliding sleeve 8 in order to encourage it to move from the disconnected position to the connected position and/or from the connected position to the locked position, and a second assistance spring 15 is designed to exert an axial force on the sliding sleeve 8 in order to encourage it to move from the disconnected position to the park position.

In the fourth embodiment of FIG. 14, the sliding sleeve 8 may comprise two parts 811, 812 that are axially mobile relative to one another. The first part 811 may be configured to collaborate with the actuator. The second part 812 may be configured to provide the coupling, selectively, in the locked, connected, disconnected and park positions. The first part 811 may be centred radially on the second part 812. The first part 811 may be rotationally connected to the second part 812 by teeth. The first and second assistance springs 14, 15 may be interposed axially between the first and second parts 811, 812. The first assistance spring 14 may be positioned axially on a first side of the first part 811 and the second assistance spring 15 may be positioned axially on a second side of the first part 812, the first side being axially closer to the first sun gear 12 than the second side.

The first and second assistance springs 14, 15 are in this instance frustoconical spring washers of the Belleville washer type.

It must be emphasised that all of the features, as they appear to a person skilled in the art on the basis of the present description, the drawings and the accompanying claims, even if in practice they have been described only in relation to other given features, both individually and according to any combination, may be combined with other features or groups of features disclosed herein, provided that this has not been expressly excluded and that technical circumstances do not make such combinations impossible or pointless.

Use of the verbs "comprise" or "include" and their conjugated forms does not exclude the presence of elements or steps other than those described in a claim.

In the claims, any reference sign between parentheses should not be interpreted as limiting the claim.

The invention claimed is:

1. A differential module for a vehicle transmission system, the differential module having a first axis of rotation and comprising:

- a planet carrier able to receive a torque supplied, directly or indirectly, by a traction motor/engine;
- at least one planet pinion pivotably mounted on the planet carrier;
- a first sun gear and a second sun gear pivoting about the first axis of rotation;
- a first wheel-driving half-shaft and a second wheel-driving half-shaft, the first wheel-driving half-shaft being rotationally connected to the first sun gear; and
- a sliding sleeve axially mobile along the first axis of rotation (X1);
- wherein the sliding sleeve is configured to occupy, selectively, four axial positions:
  - a connected position in which the sliding sleeve couples the second wheel-driving half-shaft to the second sun gear;
  - a locked position in which the sliding sleeve couples the second wheel-driving half-shaft to the planet carrier or to the first wheel-driving half-shaft;
  - a park position in which the sliding sleeve is configured to couple the second sun gear to a fixed structure; and
  - a disconnected position in which the sliding sleeve does not couple the second wheel-driving half-shaft.

2. The differential module according to claim 1, wherein the four axial positions of the sliding sleeve succeed one another in a determined sequence as the sliding sleeve progressively moves away from the first sun gear, the locked position being the position closest to the first sun gear, the connected position then succeeding the locked position, the disconnected position then succeeding the connected position and the park position then succeeding the disconnected position.

3. The differential module according to claim 2, comprising:

- a first connection by means of collaborating shapes by means of which the sliding sleeve is permanently rotationally connected to the second sun gear and by means of which the sliding sleeve slides axially with respect to the second sun gear;
- a second connection by means of collaborating shapes by means of which the sliding sleeve is coupled to the second wheel-driving half-shaft in the connected and locked positions, and by means of which the sliding sleeve is uncoupled from the second wheel-driving half-shaft in the disconnected position;

a third connection by means of collaborating shapes by means of which the sliding sleeve is configured to be coupled to a fixed structure, notably a housing, in the park position, and by means of which the sliding sleeve is configured to be uncoupled from the fixed structure in the connected, disconnected and locked positions; and a fourth connection by means of collaborating shapes by means of which the sliding sleeve is coupled to the planet carrier or to the first wheel-driving half-shaft in the locked position, and by means of which the sliding sleeve is uncoupled from the planet carrier and from the first wheel-driving half-shaft in the disconnected, connected and park positions.

4. The differential module according to claim 2, comprising:

a fifth connection by means of collaborating shapes by means of which the sliding sleeve is permanently rotationally connected to the second wheel-driving half-shaft and by means of which the sliding sleeve slides axially with respect to the second wheel-driving half-shaft;

a sixth connection by means of collaborating shapes by means of which the sliding sleeve is coupled to the second sun gear in the connected and locked positions, and by means of which the sliding sleeve is uncoupled from the second sun gear in the disconnected position;

a seventh connection by means of collaborating shapes by means of which the sliding sleeve is configured to be coupled to a fixed structure, notably a housing, in the park position, and by means of which the sliding sleeve is configured to be uncoupled from the fixed structure in the connected, disconnected and locked positions; and an eighth connection by means of collaborating shapes by means of which the sliding sleeve is coupled to the planet carrier in the locked position, and by means of which the sliding sleeve is uncoupled from the planet carrier in the disconnected, connected and park positions.

5. The differential module according to claim 2, wherein the sliding sleeve is designed to be moved by an actuator, the sliding sleeve comprising an annular groove that collaborates with a fork connected to the actuator.

6. The differential module according to claim 5, wherein a first assistance spring is designed to exert an axial force on the sliding sleeve in order to encourage the sliding sleeve to move into the connected position and/or into the locked position.

7. The differential module according to claim 6, wherein a second assistance spring is designed to exert an axial force on the sliding sleeve in order to encourage the sliding sleeve to move into the park position.

8. The differential module according to claim 7, wherein:

the sliding sleeve comprises first and second parts that are axially mobile relative to one another;

the first part being configured to collaborate with the actuator;

the second part being configured to provide coupling, selectively, in the locked, connected, disconnected and park positions; and the first and second assistance springs being interposed axially between the first and second parts.

9. Transmission A transmission system comprising the differential module according to claim 2, a housing, a gearset configured to cause the differential module to collaborate rotationally with a traction motor/engine, and an actuator configured to move the sliding sleeve in sequence into the four, locked, connected, disconnected and park, positions.

10. The differential module according to claim 1, comprising:

a first connection by means of collaborating shapes by means of which the sliding sleeve is permanently rotationally connected to the second sun gear and by means of which the sliding sleeve slides axially with respect to the second sun gear;

a second connection by means of collaborating shapes by means of which the sliding sleeve is coupled to the second wheel-driving half-shaft in the connected and locked positions, and by means of which the sliding sleeve is uncoupled from the second wheel-driving half-shaft in the disconnected position;

a third connection by means of collaborating shapes by means of which the sliding sleeve is configured to be coupled to the fixed structure in the park position, and by means of which the sliding sleeve is configured to be uncoupled from the fixed structure in the connected, disconnected and locked positions; and a fourth connection by means of collaborating shapes by means of which the sliding sleeve is coupled to the planet carrier or to the first wheel-driving half-shaft in the locked position, and by means of which the sliding sleeve is uncoupled from the planet carrier and from the first wheel-driving half-shaft in the disconnected, connected and park positions.

11. The differential module according to claim 10, wherein:

the first connection by means of collaborating shapes comprises a first toothset of a radially oriented external toothset type formed on the sliding sleeve; and/or the second connection by means of collaborating shapes comprises a second toothset of a radially oriented internal toothset type formed in a cavity of the sliding sleeve that accepts a portion of the second wheel-driving half-shaft; and/or the third connection by means of collaborating shapes comprises a third toothset of a dog clutch type formed on the sliding sleeve with the teeth directed axially; and/or the fourth connection by means of collaborating shapes comprises a fourth toothset of a dog clutch type formed on the sliding sleeve with the teeth directed axially.

12. The differential module according to claim 10, wherein the sliding sleeve is designed to be moved by an actuator, the sliding sleeve comprising an annular groove that collaborates with a fork connected to the actuator.

13. The differential module according to claim 1, further comprising:

a fifth connection by means of collaborating shapes by means of which the sliding sleeve is permanently rotationally connected to the second wheel-driving half-shaft and by means of which the sliding sleeve slides axially with respect to the second wheel-driving half-shaft;

a sixth connection by means of collaborating shapes by means of which the sliding sleeve is coupled to the second sun gear in the connected and locked positions, and by means of which the sliding sleeve is uncoupled from the second sun gear in the disconnected position;

a seventh connection by means of collaborating shapes by means of which the sliding sleeve is configured to be coupled to the fixed structure in the park position, and by means of which the sliding sleeve is configured to be uncoupled from the fixed structure in the connected, disconnected and locked positions; and an eighth connection by means of collaborating shapes by means of which the sliding sleeve is coupled to the planet carrier in the locked position, and by means of which the sliding sleeve is uncoupled from the planet carrier in the disconnected, connected and park positions.

14. The differential module according to claim 13, wherein:

the fifth connection by means of collaborating shapes comprises a fifth toothset of a radially oriented internal toothset type formed on the sliding sleeve; and/or the sixth connection by means of collaborating shapes comprises a sixth toothset of a radially oriented internal toothset type formed on the sliding sleeve; and/or the seventh connection by means of collaborating shapes comprises a seventh toothset of a dog clutch type formed on the sliding sleeve with the teeth directed axially; and/or the eighth connection by means of collaborating shapes comprises an eighth toothset of a dog clutch type formed on the sliding sleeve with the teeth directed axially.

15. The differential module according to claim 1, wherein the sliding sleeve is designed to be moved by an actuator, the sliding sleeve comprising an annular groove that collaborates with a fork connected to the actuator.

16. The differential module according to claim 15, wherein a first assistance spring is designed to exert an axial force on the sliding sleeve in order to encourage the sliding sleeve to move into the connected position and/or into the locked position.

17. The differential module according to claim 16, wherein a second assistance spring is designed to exert an axial force on the sliding sleeve in order to encourage the sliding sleeve to move into the park position.

18. The differential module according to claim 17, wherein:

the sliding sleeve comprises first and second parts that are axially mobile relative to one another;

the first part being configured to collaborate with the actuator;

the second part being configured to provide coupling, selectively, in the locked, connected, disconnected and park positions; and the first and second assistance springs being interposed axially between the first and second parts.

19. Transmission A transmission system comprising:

the differential module according to claim 1, a housing, a gearset configured to cause the differential module to collaborate rotationally with a traction motor/engine, and an actuator configured to move the sliding sleeve in sequence into the locked, connected, disconnected, and park positions.

20. A powertrain comprising:

a traction motor/engine; and the transmission system according to claim 19.

* * * * *